US010528671B1

(12) United States Patent
Robertson et al.

(10) Patent No.: US 10,528,671 B1
(45) Date of Patent: *Jan. 7, 2020

(54) SYSTEM AND METHOD FOR ACTIONIZING COMMENTS USING VOICE DATA

(71) Applicant: NarrativeDx Inc., Austin, TX (US)

(72) Inventors: Kyle Robertson, Austin, TX (US); Taylor Turpen, Pflugerville, TX (US)

(73) Assignee: NarrativeDx Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,816

(22) Filed: Jun. 25, 2019

Related U.S. Application Data

(63) Continuation-in-part of application No. 16/236,997, filed on Dec. 31, 2018, now Pat. No. 10,331,790, which is a continuation of application No. 16/170,428, filed on Oct. 25, 2018, which is a continuation-in-part of application No. 16/156,336, (Continued)

(51) Int. Cl.
*G06F 17/27* (2006.01)
*G06F 16/61* (2019.01)
*G06Q 50/22* (2018.01)

(52) U.S. Cl.
CPC .......... *G06F 17/2785* (2013.01); *G06F 16/61* (2019.01); *G06Q 50/22* (2013.01)

(58) Field of Classification Search
CPC .............. G06F 17/241; G06F 17/2785; G06F 16/24578; G06F 16/285; G06F 16/7867; G06F 16/3334; G06F 16/58; G06F 16/30; G06F 16/38; G06F 16/907; G06F 16/24573; G06F 16/5866; G06F 17/271; G06F 17/2775; G06F 16/951; G06F 16/9535; G06F 16/48; G06F 16/35; G06F 17/27;
(Continued)

(56) References Cited

U.S. PATENT DOCUMENTS 9,129,008 B1 * 9/2015 Kuznetsov ............ G06F 16/435
2012/0151347 A1 * 6/2012 McClements, IV .......................
G06Q 10/101
715/716
(Continued)

OTHER PUBLICATIONS

Office Action for U.S. Appl. No. 15/277,892 dated Mar. 12, 2018, NRX-001 US—U II, 17 pages.
(Continued)

*Primary Examiner* — Huyen X Vo
(74) *Attorney, Agent, or Firm* — Barnes & Thornburg LLP

(57) ABSTRACT

A system and method for processing and actionizing structured and unstructured experience data is disclosed herein. In some embodiments, a system may include a natural language processing (NLP) engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts. In some embodiments, the data set may include voice data from a voice based assistant or a voice based survey.

18 Claims, 10 Drawing Sheets

Related U.S. Application Data filed on Oct. 10, 2018, now Pat. No. 10,261,992, which is a continuation of application No. 15/277,892, filed on Sep. 27, 2016, now Pat. No. 10,114,814.

(60) Provisional application No. 62/233,657, filed on Sep. 28, 2015.

(58) Field of Classification Search
CPC .. G06F 16/245; G06F 16/3344; G06F 16/345; G06F 16/583
See application file for complete search history.

(56) References Cited

U.S. PATENT DOCUMENTS

| | | |
|---|---|---|
| 2014/0201749 A1 | 7/2014 | Bao |
| 2015/0106360 A1 | 4/2015 | Cao |
| 2016/0071517 A1* | 3/2016 | Beaver .................. G06F 17/279 704/9 |

OTHER PUBLICATIONS

Office Action for U.S. Appl. No. 15/277,892 dated Oct. 13, 2017, NRX-001 US—U ||, 14 pages.
Office Action for U.S. Appl. No. 15/277,892 dated Jun. 26, 2017, NRX-001 US—U ||, 10 pages.
Office Action dated Apr. 2, 2019 for U.S. Appl. No. 16/236,997 (pp. 1-34).

\* cited by examiner

TABLE ONE

| TEXT | DATE | UNIT | PERSON |
|---|---|---|---|
| My nurse was mean and she hit me | 01/01/2015 | 4E | None |
| I like the food. I do not like the beds | 01/02/2015 | 3E | None |

FIG. 4

TABLE TWO

| PHRASE ID | SENTIMENT | NAMED ENTITY | PRIMARY TAG | SECONDARY TAG | DRIVER | APPROVAL |
|---|---|---|---|---|---|---|
| 1 | Negative | None | Nurses | Courtesy and respect | None | True |
| 2 | Positive | None | Meals | Overall quality | None | True |
| 3 | Negative | None | Room | Comfort | Bed | True |

FIG. 5

TABLE THREE

| PHRASE ID | SENTIMENT | NAMED ENTITY | PRIMARY TAG | SECONDARY TAG | DRIVER |
|---|---|---|---|---|---|
| 1 | Negative | None | Nurses | Courtesy and respect | None |
| 2 | Positive | None | Meals | Overall quality | None |
| 3 | Negative | None | Room | Comfort | Bed |

FIG. 6

SYSTEM AND METHOD FOR ACTIONIZING COMMENTS USING VOICE DATA

PRIORITY CLAIM

This application is a continuation-in-part of U.S. application Ser. No. 16/236,997, filed Dec. 31, 2018, which is a continuation of U.S. application Ser. No. 16/170,428, filed Oct. 25, 2018, which is a continuation-in-part of U.S. application Ser. No. 16/156,336, filed Oct. 10, 2018, which is a continuation of U.S. application Ser. No. 15/277,892, filed Sep. 27, 2016, which claims priority under 35 U.S.C. § 119(e) to U.S. Provisional Application Ser. No. 62/233,657, filed Sep. 28, 2015, each of which is expressly incorporated by reference herein.

BACKGROUND

The present disclosure generally relates a system and method for processing and actionizing structured and unstructured experience data. The system and method described herein may be used for processing disparate experience data sources such as user records, surveys, review sites, and social media.

SUMMARY

The present disclosure is a system and method for processing and actionizing structured and unstructured experience data. In some embodiments, a system may include a natural language processing ("NLP") engine configured to transform a data set into a plurality of concepts within a plurality of distinct contexts, and a data mining engine configured to process the relationships of the concepts and to identify associations and correlations in the data set. In some embodiments, the method may include the steps of receiving a data set, scanning the data set with an NLP engine to identify a plurality of concepts within a plurality of distinct contexts, and identifying patterns in the relationships between the plurality of concepts.

One aspect of the present disclosure is a system for processing and actionizing experience data. The system comprises a server comprising a natural language processing (NLP) engine, and a relational database. Communications are received at the server, and each of the communications comprises comment data. The comment data from each of the communications is stored at the relational database. The comment data from each of the communications is parsed for individual phrases to generate a plurality of phrases. One or more phrases are selected from the plurality of phrases based on a predetermined parameter. At the NLP engine one or more annotations are predicted for the one or more phrases based upon a score.

Another aspect of the present disclosure is a method for processing and actionizing patient experience data. The method includes receiving at a server a plurality of communications. Each of the plurality of communications comprises comment data. The method also includes storing the comment data of each of the plurality of communication at a relational database. The method also includes parsing the comment data for individual phrases to generate a plurality of phrases. The method also includes selecting one or more phrases from the plurality of phrases based on a predetermined relationship. The method also includes predicting at a NLP engine one or more annotations for the one or more phrases based upon a score.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4 is an illustration of a response table into which data that has undergone ETL is saved;

FIG. 5 is an illustration of a manual batching report table within which the preliminary analysis of pipelined data is represented;

FIG. 6 is an illustration of an annotation table which represents the final analysis of pipelined data;

DETAILED DESCRIPTION

This present disclosure relates to a system and method for processing and actionizing structured and unstructured experience data. The present disclosure includes a hybrid NLP pipeline, which, combined with machine learning and crowd sourcing, recognizes the sentiments, themes, and named entities within the data. Pipelined data is then visualized on a user dashboard, outlining areas where the user has performed well and areas where the user can improve.

In the present disclosure, the terms "field," "data element," and "attribute" may be used as synonyms, referring to individual elements of digital data. Aggregates of data elements may be referred to as "records" or "data structures." Aggregates of records may be referred to as "tables." Aggregates of tables may be referred to as "databases." "Data mining" is, for example, an analytic technique to dynamically discover patterns in historical data records and to apply properties associated with these records to production data records that exhibit similar patterns. "Unordered," for example, means that the chronology of a record's attributes is not known. "Unstructured," for example, means that the attributes of a comment or phrase are not known.

Figure 1:
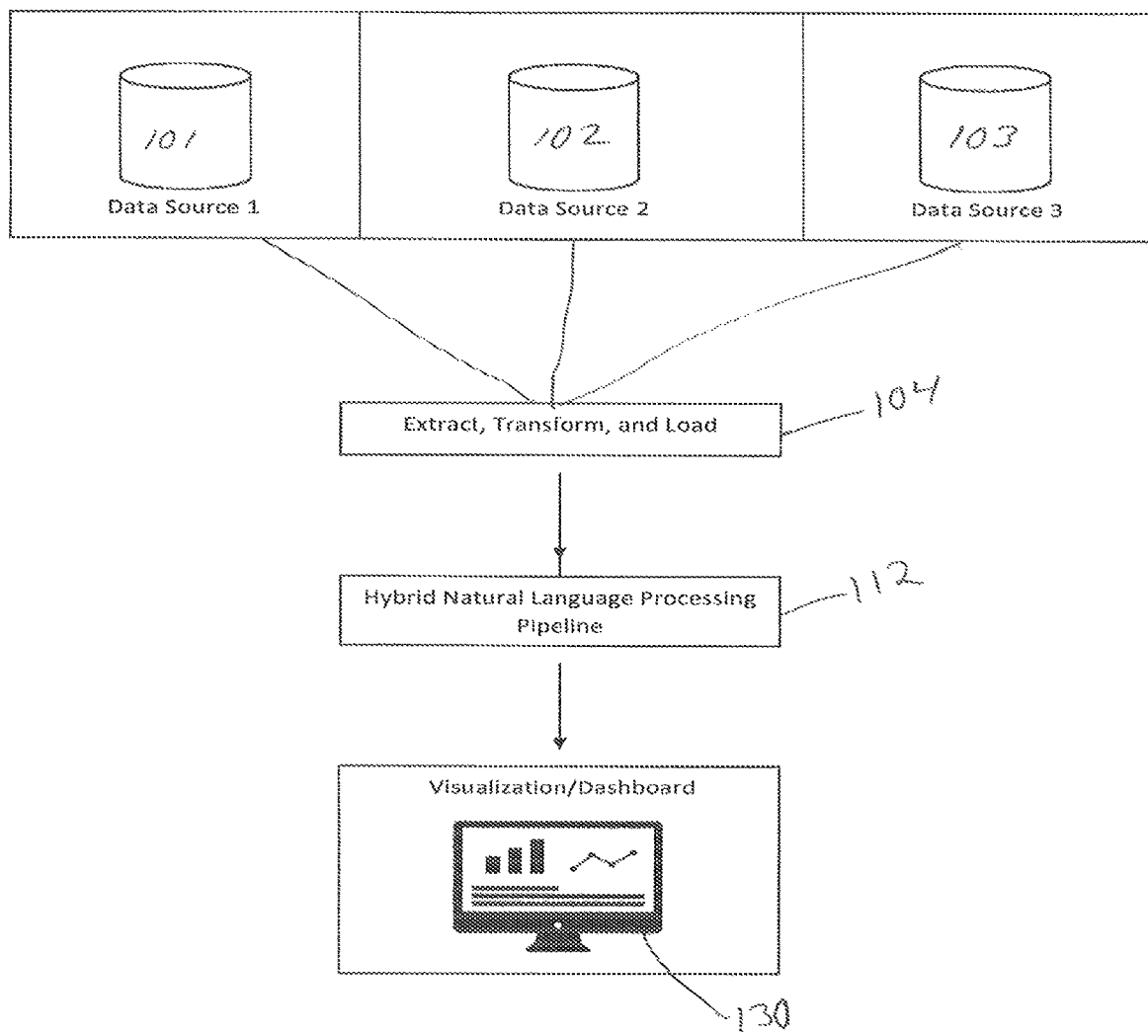
FIG. 1 is a diagrammatic flow chart of the overview of a system for processing and actionizing experience data.
Figure 2:
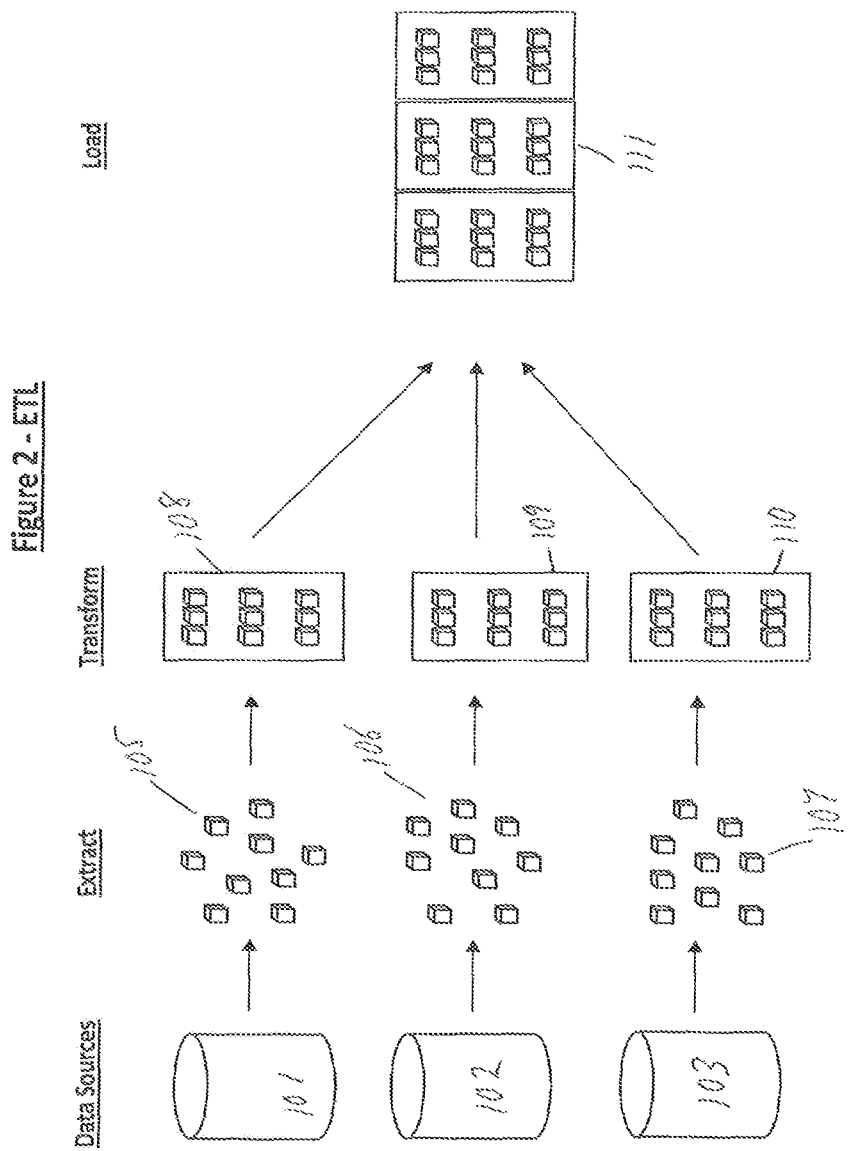
FIG. 2 is an illustration of how an ETL job of FIG. 1 is completed using sample input data and sample output data according to the embodiment of the present invention.
Figure 3:
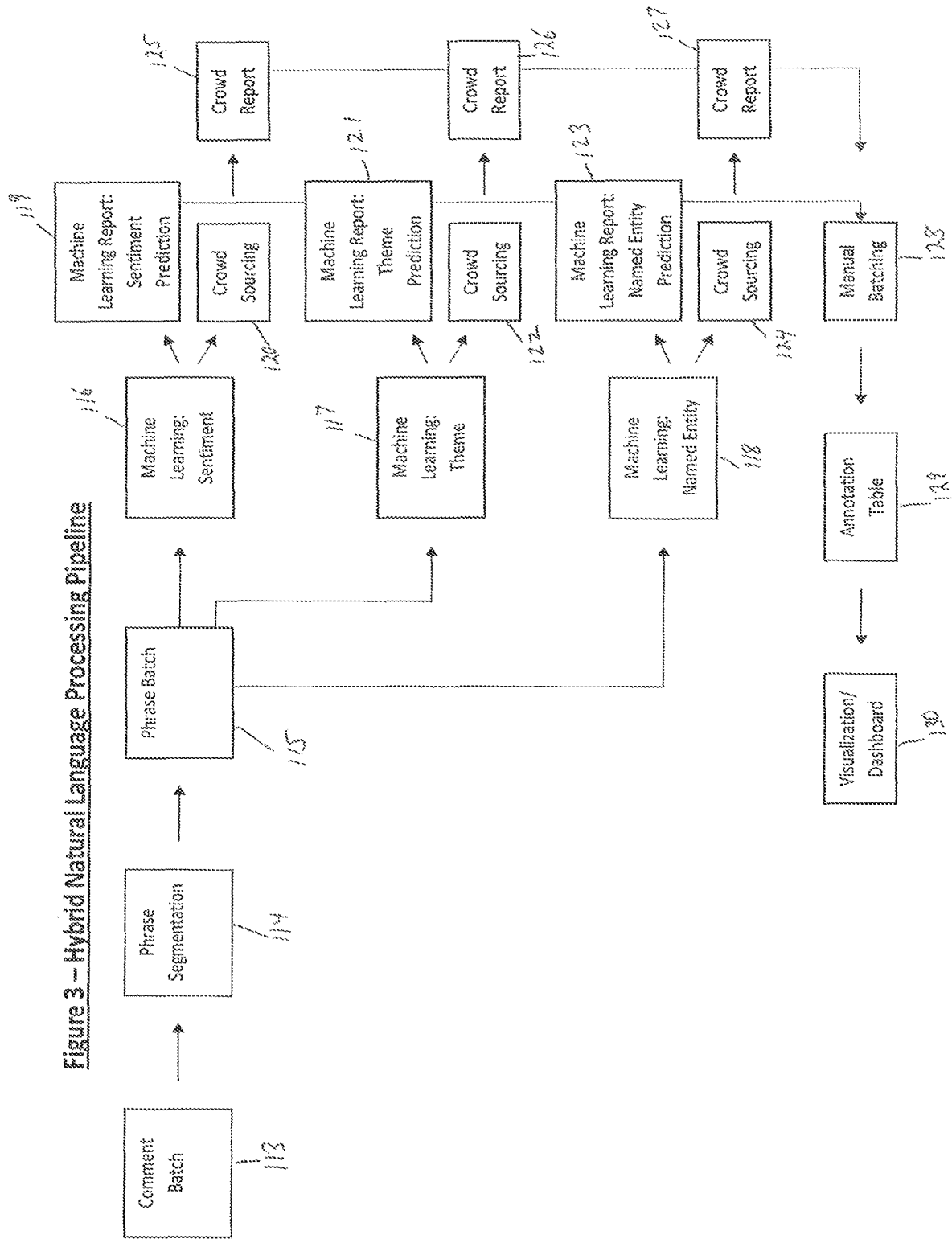
FIG. 3 is a flow chart of the hybrid NLP pipeline of FIG. 1.

FIGS. 1-3 show an embodiment of the present disclosure that is visualized, for example, on the dashboard 130. FIG. 1 provides an overview of the system. It illustrates how input, that is, comments, from various sources are aggregated to then undergo ETL 104 to become structured and ordered information. In one example, the sources may be hospital surveys, verbatims, and social media posts. In another example, the sources may be employment surveys, exit surveys, and social media posts. In yet another example, the sources may be airline, hotel, restaurant, or financial services customer surveys or online reviews. This information next enters the hybrid NLP pipeline 112, where comments are segmented into phrases, the phrases studied to recognize sentiment, theme, and any named entity, which are finally approved and reflected in a batching report 128. The finalized information within the batching report is then visualized on a user's dashboard 130 or provided via an API, providing business intelligence for the user to act upon the inputted patient feedback.

FIG. 2 illustrates the ETL process of FIG. 1. Box 101 represents patient feedback data in HTML form, such as posts from social media. This data is unstructured and unordered. In one example, box 102 represents data from hospital surveys. This data is structured, but unordered. In another example, box 103 represents data from adaptive rounding surveys. This data is structured and ordered; thus requiring minimal extraction and transformation.

During extraction, 105 through 107, information from the data sources is converted from unstructured form to structured form. During transformation, 108 to 110, it is also converted from unordered to ordered form. Once input is extracted and transformed, loading 111 occurs wherein its attributes are recognized and loaded into the response table, shown in FIG. 4, thereby establishing the input's record. As shown in FIG. 4, each row of the table represents a different record. Each record may comprise at least one of an input's text and date (i.e., its timestamp). Depending on the data source, however, the record may also contain an input's unit, the name of a professional about whom the input was written, and the input author's demographics.

Next, as shown in FIG. 3, from the response table of FIG. 4, a subset of comments, or a comment batch 113, enters the hybrid NLP pipeline. The hybrid NLP pipeline operates on a server. Comments are parsed for individual phrases based upon punctuation 114. A phrase includes either a full sentence or a part of a sentence that represents a complete thought. From this, a phrase batch is developed 115 for machine learning analysis. Each phrase is given a phrase identification number. Through machine learning, a phrase's sentiment, theme, and any named entity therein is predicted based upon a percentage of likelihood, 116 through 118. The machine learning for these areas, 116 through 118, is preferably done simultaneously.

Machine learning may produce a prediction for anyone of the areas only if the percentage of likelihood satisfies a predetermined relationship, for example a threshold percentage. This prediction along with the percentage of likelihood on which the prediction is based will be noted in the machine learning reports for sentiment 119, theme 121, and named entities 123. If the predetermined relationship is not satisfied, however, machine learning will not produce a prediction for an area. Instead, the phrase may be sent to be crowd sourced or individually reviewed to determine what the ambiguous sentiment, theme, or named entity is, 120, 122, or 124. Then, upon the majority vote of crowd-sourcers or individual review, a prediction will be made and reflected in the respective crowdsourcing report, 125 through 127. Other criteria than majority, such as specific percentages, may be used instead of simple majority. Alternatively, instead of sending the phrase for crowd-sourced or individual review, a rule or set of rules may be used to determine what the ambiguous sentiment, theme, or named entity is 120, 122, or 124.

For example, in regards to sentiment, machine learning attempts to predict whether a phrase is positive or negative 116. However, if the threshold percentage is set at 90% and if machine learning can only predict that the likelihood that a phrase is positive is 84%, it will not produce a sentiment prediction 119. The phrase will instead be crowd sourced 120 and voted upon to establish its sentiment prediction, which will be reflected in the sentiment crowd report 125. The prediction results of the machine learning reports and the crowd sourcing reports for each phrase are next compiled and reviewed during the batching step 128 (manual or automatic). Preferably, for manual batching, there is a human review of the predictions in which any area's sentiment's, theme's, or named entity's machine learning or crowd sourcing prediction is marked as true or false, or, in other words, approved or rejected autonomously and with final authority at step 128. The purpose of the step is to ensure accuracy. Upon completion, as shown in Table Two of FIG. 5, each phrase is then listed by its identification number and the phrase's sentiment and any named entity therein is reflected. The phrase is also given a primary and possibly a secondary tag. A primary tag reflects what a phrase is mainly about. This usually corresponds with the subject of a phrase. A secondary tag is optional and reflects a phrase's general theme. A phrase can have multiple primary or secondary tags.

Once the results of the batching (manual or automatic) are finalized, they are inputted into the annotation table 129 (and as shown in Table Three of FIG. 6). At the annotation table 129, each phrase from the comment batch 113 is listed by phrase identification number and mirrors the records of the manual batching report of FIG. 5, except that there is no approval step. The information reflected in the annotation table of FIG. 6, is thus the finalized records of each phrase, which is then visualized on a user's dashboard 130 to provide the user with business intelligence and allow the user to actionize patient feedback, 101 through 103.

The NLP engine preferably predicts if a phrase is positive or negative. The NLP engine preferably tags each phrase based on a subject matter of the phrase.

The system further comprises a dashboard for providing business intelligence for the user to act upon the inputted patient feedback. This information can also be provided via an API.

The comment data of each of the plurality of communications is preferably extracted at server, wherein the extracted texts are transformed to a format compatible with a target, and wherein the transformed texts are loaded into a plurality of tables of the relational database.

The comment data from each of the plurality of communications is preferably parsed for individual phrases based upon punctuation or linguistic structure. A phrase's annotation preferably comprises one of a phrase's sentiment, theme, or any named entity therein. The plurality of communications is preferably collected from publicly available data or uploaded from an entity. In one example, the entity may be a hospital, medical provider, employer, third party service provider or data collection service or the like. Phrases that receive a complete annotation (sentiment, primary tag, secondary tag with an optional driver), also generate an improvement action because the logic of the annotation is structured such that there is one improvement for each unique annotation. Each phrase of the plurality of phrases is preferably provided with an identification.

A system for processing and actionizing experience data comprises a server comprising a natural language processing (NLP) engine, and a relational database. The server operates, for example, on AMAZON web services ("AWS"), and the engine is written in PYTHON running on the server, for example. The relational database is, for example, Postgresql running on AWS. The communications received at the server are preferably scraped comments from Internet web sites such as YELP, ZOCDOC, or the like. Each of the communications comprises comment data such as survey comments from patient satisfaction surveys or employment surveys or customer feedback surveys. The relational database preferably maps sources to their comments. The comment data from each of the communications is parsed for individual phrases to generate a plurality of phrases, preferably by linguistic structure. One or more phrases are selected from the plurality of phrases based on a predetermined parameter. At the NLP engine one or more annotations are predicted for the one or more phrases based upon a predetermined relationship, for example a score, such as a sentiment and a theme assigned to each phrase with a score meeting a criteria, such as being greater than 0.5. Any other suitable relationship may be used.

For example, a web-scraped comment from YELP from a patient that stated "My nurse was mean and she hit me," is received at the server. A survey comment that, "I like the food. I do not like the beds" is also received at the server. The comments are parsed into: My nurse was mean; she hit me; I like the food; and I do not like the beds. In this example, phrases are selected based on linguistic characteristics—the content having more than three words. So the following phrases are selected: My nurse was mean; I like the food; and I do not like the beds. Next, at the NLP engine one or more annotations are predicted for the one or more phrases based upon a score. Negative (0.7)+Attitude (0.6): Negative+Attitude: My nurse was mean. Positive (0.8)+ Food (0.4): Positive: I like the food. Negative (0.3)+Comfort (0.9): Comfort: I do not like the beds.

The hybrid natural language processing pipeline ("pipeline") is a natural language batch-processing system. The input for the pipeline is organized as "batches" (groups) of "documents." Alternatively, the pipeline processes one batch at a time. Pieces of each document are referred to as "phrases." A phrase can be any text within the document, including the entire document. The pipeline's primary function is to take batches of comments, split the comments into phrases and then assign an annotation to each phrase. An annotation, for example, is a complete set of categorical or numeric labels.

The hybrid natural language processing pipeline combines four components to generate high quality annotations: Rulebased, Machine, Crowd, and Annotation. The rulebased component uses rules to generate individual labels for any annotation type with 100% certainty. The machine component generates labels for any phrase with variable certainty. The crowd component generates labels for any phrase using an open-call pool of workers. The annotation component uses logic to decide which labels from which components are ultimately assigned to each phrase.

A method for processing and actionizing experience data begins with collecting data from multiple sources: Internal sources, such as grievances, nurse rounding, call transcripts, etc; Public sources, such as Hospital Compare, CMS, Doctor Review Sites and Social Media; and Surveys, such as CAHPS, HCAHPS, CG-CAHPS and custom surveys, as well as employee engagement surveys and customer feedback surveys. The next step is to Perform Annotations with Hybrid NLP Pipeline. The annotations preferably comprise: Themes, Named Entities, Sentiment, Category Discovery, and Category Annotation. The next step is to generate improvement suggestions for each category. The next step is to combine qualitative and quantitative data with new data collected by repeating the process from the first step.

Figure 7:
FIG. 7 is an illustration for a web page for a dashboard of a system for processing and actionizing experience data.

FIG. 7 is an illustration for a web page 700 for a dashboard of a system for processing and actionizing experience data.

Figure 8:
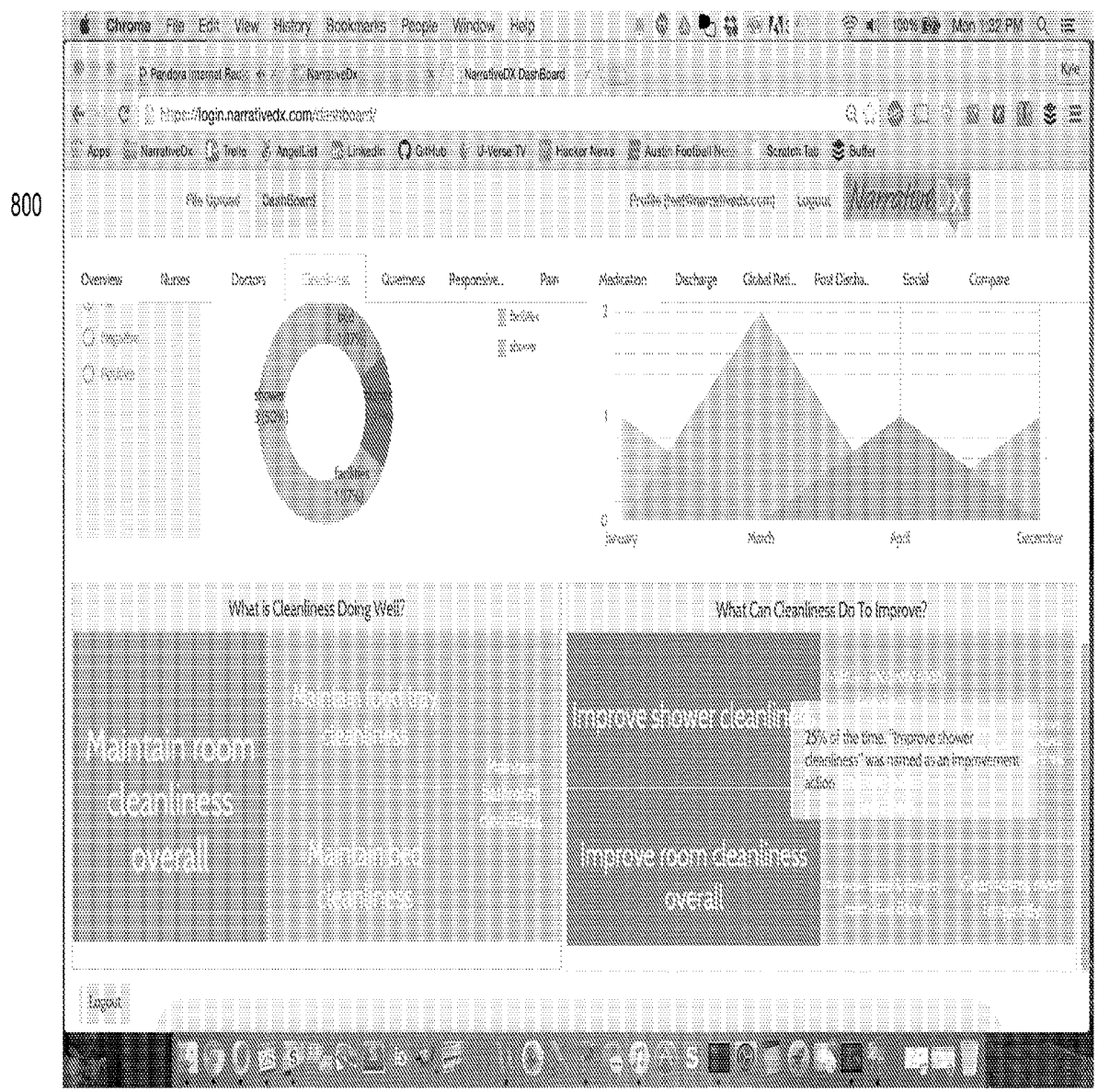
FIG. 8 is an illustration for a web page for a dashboard of a system for processing and actionizing experience data.

FIG. 8 is an illustration for a web page 800 for a dashboard of a system for processing and actionizing experience data.

Figure 9:
FIG. 9 is an illustration for a web page for a dashboard of a system for processing and actionizing experience data.

FIG. 9 is an illustration for a web page 900 for a dashboard of a system for processing and actionizing experience data.

The server includes a CPU component, a graphics component, PCI/PCI Express, RAM memory, non-removable storage, removable storage, Network Interface, including one or more connections to a fixed network, and a SQL database. Included in the memory, are the operating system, the SQL server, and computer programs. The data server also includes at least one computer program configured to receive data uploads and store the data uploads in the SQL database. The SQL server comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS, and Flash. The databases used with the system preferably include but are not limited to MSSQL, Access, MySQL, Progress, Oracle, DB2, Open Source DBs and others. Operating system used with the system preferably include Microsoft 2010, XP, Vista, 2000 Server, 2003 Server, 2008 Server, Windows Mobile, Linux, Android, Unix, I series, AS 400, and Apple OS.

The underlying protocol at the server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

Natural language processing ("NLP") is a field of computer science, artificial intelligence, and linguistics concerned with the interactions between computers and human languages. It involves the processing of a natural language input. A natural language input is generally language used by a person (as opposed to a computer language or other artificial language), including all of the idioms, assumptions and implications of an utterance in a natural language input. Natural language processing implemented by a computer is typically an attempt to determine the meaning of a natural language input such that the natural language input can be "understood" and/or acted on by the computer. To interact with humans, natural-language computing systems may use a data store that is parsed and annotated.

In the healthcare and employer industries, for example, there is a need for systems and methods that are able to rapidly parse, combine, and interpret multiple structured and unstructured data sources. Healthcare information, such as information related to a patient's care experience and satisfaction, is fractured across many isolated data stores in varying formats. The same may be true regarding employment or employee satisfaction. To compound the problem, even when data is available, there are no easily available means of processing this data with a high degree of accuracy or efficiency.

Moreover, in health care data management systems today, only about 20% of data is structured or machine-readable. Information that is not structured or machine readable may be ignored or unusable in conventional analytics systems. Online data sources, such as doctor review sites and social media, consist of largely unstructured data. Additionally, data collected from surveys or other public and private sources is often a mixture of both unstructured and structured data that varies between data stores. Due to lack of interoperability between these data stores and formats, these sources have not been analyzed in conjunction with one another.

Significantly, online data sources have risen in importance for healthcare providers, similar to most customer-focused industries. Online data sources may also be important for employers and other industries that collect customer feedback. Data from online sources is extracted, transformed, and loaded into a structured/compatible form. Extract, Transform, Load (ETL) jobs extract data from a source, transform the extracted data using one or more transformations to a format compatible with a target, and load the data into the target, for example a target database. Extraction refers to actually obtaining the data from individual data sources. Transformation indicates processing the data to put it into a more useful form or format. Loading refers to the process of loading the data into the tables of a relational database.

Attempts have been made to use customer-focused NLP systems from the hospitality and restaurant industries in other spaces, but these systems' lack of specificity for particular uses make them inaccurate and ineffective for actionizing feedback. Further, investments in such technologies do not yield the comprehensive, reliable, or actionable information necessary to improve an organization's viability, for example, a healthcare organization. Instead, the value-added by the data reviewed by these technologies is diminished as true data integration and interoperability is not achieved.

There have been few attempts to construct healthcare-specific or employee engagement-specific NLP systems that may automatically collect and annotate key information related to the patient's care experience and satisfaction, such as the patient's sentiment regarding the experience, identification of key staff involved in the experience and key themes describing the care experience.

Performing these annotations with a high degree of accuracy has proven to be a difficult task due to the complex nature of language, the many ways that a care experience concept can be expressed, the inherent complexity of the subject matter, and the distributed and varied nature of the available data sources. As a result, NLP software tends to be large, expensive and complex, difficult to develop and maintain, and demands significant processing power, working memory, and time to run. Further, when attempting to process data from isolated sources in differing formats, annotation accuracy is difficult to achieve. This is especially true for unstructured data-annotations regarding sentiments, named entities, key themes and the like that may fall below a traditional threshold for statistical significance. Nevertheless, unstructured data may indicate real problems with care experiences that are of value to healthcare administrators. Despite its value, it has traditionally been difficult to process and understand.

Furthermore, some methods of data extraction are slow and ineffective. These systems, however, which use only a fraction of the data available, may reduce cost and improve outcomes. If systems and methods had the capability of using the knowledge incorporated within unstructured data in an efficient manner to improve experience, the benefits would be tremendous. By using this knowledge, a user's experience could be improved and cost reduced through quality improvement, efficiency, comparative effectiveness, safety, and other analytics powered by this data.

Thus, there is a need in the field of processing experience data, and more specifically in the field of processing disparate data sources such as medical records, employee records, government surveys, employee surveys, review sites and social media, for new and improved systems and methods for processing data. In particular, systems and methods are needed that are able to rapidly parse, combine, and interpret multiple structured and unstructured data sources. Described herein are devices, systems, and methods that address the problems and meet the identified needs described above.

Figure 10:
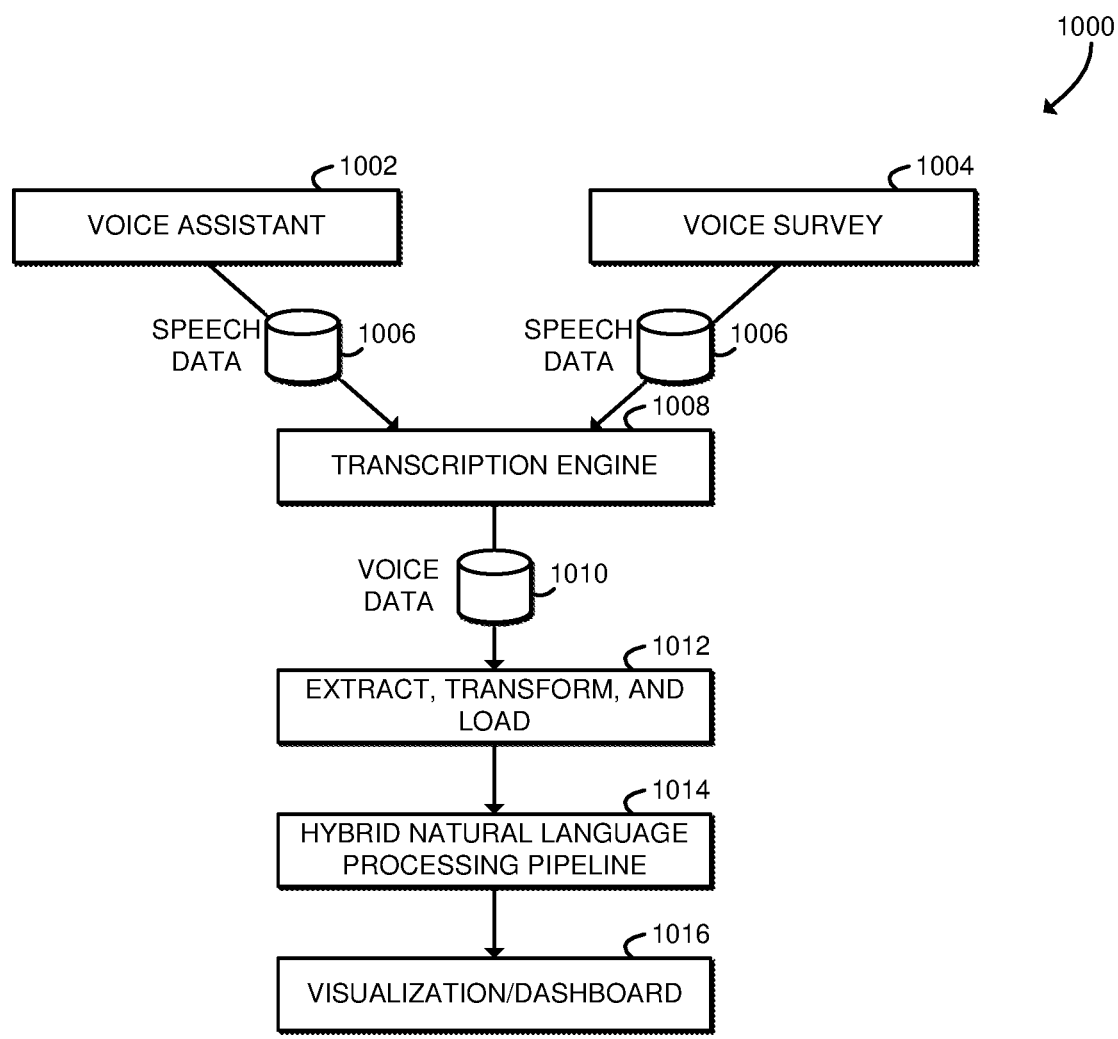
FIG. 10 is a diagrammatic flow chart of the overview of a system for processing and actionizing voice data.

Referring now to FIG. 10, an overview of a system 1000 for processing and actionizing voice data is shown. Inputs to the system 1000 may include voice data or other data derived from oral interactions or other utterances of one or more users with the system 1000. In some embodiments, a voice assistant 1002 may collect speech data 1006. The voice assistant 1002 may be embodied as a voice-based virtual personal assistant or other voice-based user interface. The voice assistant 1002 may, for example, provide a conversational interface with a user. As another example, the voice assistant 1002 may support voice-based commands or other voice-based user interactions. The voice assistant 1002 may be embodied as, for example, Amazon® Alexa®, Apple® Siri®, Google Assistant™, or any other voice-based assistant. Additionally or alternatively, in some embodiments, a voice survey 1004 may collect speech data 1006. The voice survey 1004 may be embodied as a telephone survey, computerized survey, or other survey that collects voice responses from one or more users of the system 1000.

Speech data 1006 from the voice assistant 1002, the voice survey 1004, and/or other sources is input to a transcription engine 1008. The speech data 1006 may be embodied as audio data, waveform data, phenome data, or other data indicative of speech collected from users. The transcription engine 1008 transcribes the speech data 1006 to generate voice data 1010. The voice data 1010 may be embodied as or otherwise include text data, lexical data, or other data indicative of the words, phrases, sentences, or other language spoken by the users. For example, the transcription engine 1008 may be embodied as an automatic speech-to-text engine or other speech recognition engine. The voice data 1010 may be embodied as structured or unstructured data.

As shown, the voice data 1010 is input to an extract, transform, and load (ETL) stage 1012. The ETL stage 1012 may be similar to and/or the same as the ETL 104 of FIGS. 1-3, described above. As described above, the ETL stage 1012 may extract information, converting the information from unstructured form to structured form. The ETL stage 1012 may transform the information, which may convert data from unordered to ordered form. The ETL stage 1012 may load the information, in which attributes are recognized and loaded into appropriate database tables.

After the ETL stage 1012, the processed voice data is input into a hybrid natural language processing (NLP) pipeline 1014. The hybrid NLP pipeline 1014 may be similar to and/or the same as the hybrid NLP pipeline 112 of FIGS. 1-3, described above. As described above, the hybrid NLP pipeline 1014 parses the processed voice data to extract individual phrases. The hybrid NLP pipeline 1014 applies a machine learning analysis to predict annotations, including a phrase's sentiment, theme, and any named entity therein. If the machine learning analysis does not produce a prediction, a prediction may be generated based on a reference score (e.g., through individual review or crowd-sourcing). The hybrid NLP pipeline 1014 may store predicted annotations in an annotation table.

After NLP analysis, the annotations are input to a visualization/dashboard 1016. The visualization/dashboard 1016 may be similar to and/or the same as the dashboard 130 of FIGS. 1-9, described above. The information in the annotation table may be visualized on a user's dashboard 1016 to provide the user with business intelligence and allow the user to actionize the voice data. Additionally or alternatively, in some embodiments, the visualization/dashboard 1016 may provide data to an external destination via an API or other interface.

The various components of the system 1000 may be embodied as one or more physical servers, virtual servers, or other computing devices. For example, in some embodiments, one or more physical or virtual servers hosted by a cloud computing provider (or a cluster of physical or virtual servers) may execute the ETL stage 1012, the hybrid NLP pipeline 1014, and the dashboard 1016. In that embodiment, the voice data 1010 may be provided by one or more clients using an API established by the system 1000 for the ETL stage 1012. The voice data 1010 may be generated by one or more client devices, client servers, and/or third-party services. For example, the voice data 1010 may be generated by a voice assistant 1002 and transcription engine 1008 executed by one or more client devices (e.g., smartphones, smart speaker devices, mobile devices, or other voice assistant client devices) in cooperation with a voice assistant service (e.g., Alexa, Ski, Google Assistant, or similar). Similarly, as another example, the voice data 1010 may be generated by a voice survey 1004 and transcription engine 1008 executed by one or more servers or other devices.

As another example, the transcription engine 1008, the ETL stage 1012, the hybrid NLP pipeline 1014, and the dashboard 1016 may be hosted by the same physical and/or virtual server or cluster of servers. In that example, the speech data 1006 (e.g., audio waveforms or other speech data) may be provided using an API established by the system 1000 for the transcription engine 1008. Of course, it should be understood that in some embodiments all components of the system 1000 may be hosted by the same physical and/or virtual server or cluster of servers.

Figure 11:
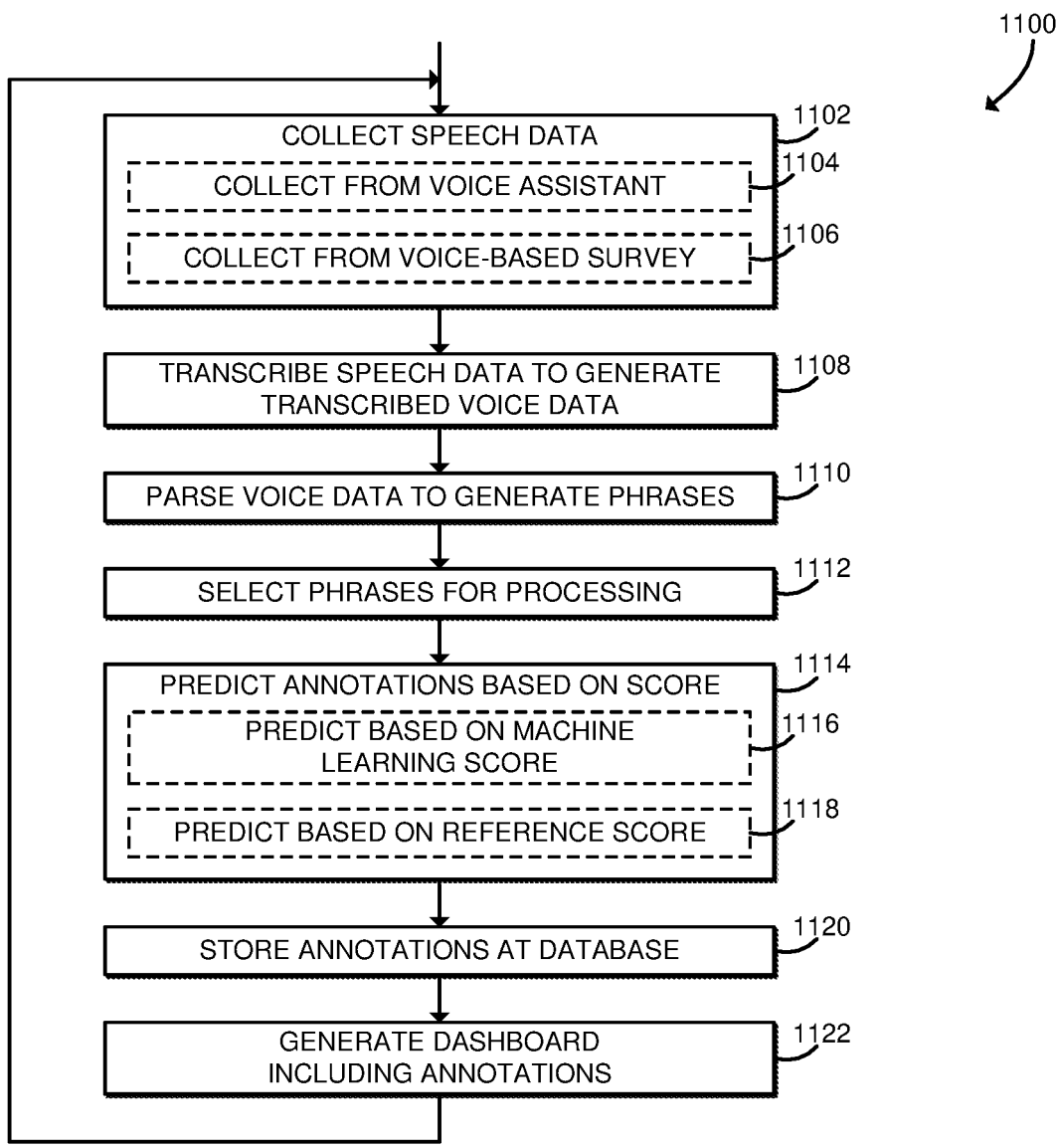
FIG. 11 is a flow chart of at least one method for processing and actionizing voice data that may be performed by the system of FIG. 10.

Referring now to FIG. 11, an illustrative method 1100 for processing and actionizing voice data is shown. The method 1100 may be executed by one or more servers or other computing devices as described above in connection with the system 1000. The method begins in block 1102, in which the system 1000 collects speech data 1006 from one or more users. Users may include patients, employees, or other sources of speech data. In some embodiments, in block 1104, the system 1000 collects the speech data 1006 from a voice assistant 1002. In some embodiments, in block 1106, the system 1000 collects the speech data 1006 from a voice-based survey 1004.

In block 1108, the system 1000 transcribes the speech data 1006 to generate transcribed voice data 1010. Although illustrated as collecting and then transcribing the speech data 1006, it should be understood that in some embodiments those functions may be performed in a different order and/or may be combined. For example, in some embodiments speech data 1006 may be transcribed into voice data 1010 before being collected by a voice assistant and/or a voice-based survey. As another example, an integrated voice assistant and/or an integrated voice-based survey may generate transcribed voice data 1010 directly. In those embodiments, the voice data 1010 may be provided to the ETL stage 1012 and/or the NLP pipeline 1014, for example via one or more APIs.

In block 1110, the system 1000 parses the voice data 1010 to generate one or more phrases. The voice data 1010 may be parsed, for example, based on punctuation or other delimiters included in the voice data 1010. In block 1112, the system 1000 selects one or more phrases for natural language processing. The phrases may be selected for processing based on one or more predetermined parameters.

In block 1114, the system 1000 predicts annotations for the phrases based on a score. In some embodiments, in block 1116, the system 1000 may predict one or more annotations based on a machine learning score. For example, the system 1000 may determine whether a machine learning score generated by an NLP engine exceeds a predetermined threshold score (or has another predetermined relationship to the threshold score). In some embodiments, in block 1118 the system 1000 may predict one or more annotations based on a reference score. For example, the system 1000 may predict based on the reference score if the machine learning score does not exceed the predetermined threshold score. The reference score may be embodied as, for example, a crowdsourced score or a score generated by individual review of the phrase.

In block 1120, the system 1000 stores the annotations at a database. For example, the annotations may be stored in an annotation table or other table of a relational database. In block 1112, the system 1000 generates a dashboard that includes the annotations. For example, the system 1000 may generate a web page or other interactive user dashboard that includes the annotations. After generating the dashboard, the method 1100 loops back to block 1102 to continue collecting and analyzing speech data 1006.

From the foregoing it is believed that those skilled in the pertinent art will recognize the meritorious advancement of the present disclosure and will readily understand that while the present disclosure has been described in association with one or more embodiments thereof, and other embodiments illustrated in the accompanying drawings, numerous changes modification and substitutions of equivalents may be made therein without departing from the spirit and scope of the present disclosure which is intended to be unlimited by the foregoing except as may appear in the following appended claim. Therefore, the embodiments of the present disclosure in which an exclusive property or privilege is claimed are defined in the following appended claims.

The invention claimed is:

1. A system for processing and actionizing experience data, the system comprising:
   a server comprising a natural language processing (NLP) engine; and
   a relational database;
   wherein a plurality of communications is received at the server, each of the plurality of communications comprises voice data, wherein the voice data comprises structured or unstructured data, and wherein the voice data comprises lexical data transcribed from speech data;
   wherein the voice data from each of the plurality of communications is parsed for individual phrases to generate a plurality of phrases;
   wherein one or more phrases are selected from the plurality of phrases based on a predetermined parameter;

wherein the NLP engine is to predict one or more annotations for the one or more phrases based upon a score, wherein to predict the one or more annotations for the one or more phrases based upon the score comprises to (i) predict one or more annotations for the one or more phrases based upon a machine learning score, (ii) determine whether the machine learning score is less than a predetermined threshold score, and (iii) predict the one or more annotations for the one or more phrases based upon a reference score in response to a determination that the machine learning score is less than the predetermined threshold score; and wherein the one or more annotations are stored at the relational database in response to prediction of the one or more annotations.

2. The system of claim 1, wherein the voice data is collected from a voice assistant.

3. The system of claim 1, wherein the voice data is collected from a voice-based survey.

4. The system of claim 1, further comprising a transcription engine, wherein the speech data is transcribed by the transcription engine to generate the voice data.

5. The system of claim 1, wherein the server is to generate a dashboard web page for a user that includes the one or more annotations in response to prediction of the one or more annotations.

6. The system of claim 1, wherein the one or more annotations comprise a sentiment, a theme, or any named entity of the one or more phrases.

7. The system of claim 6, wherein the one or more annotations are stored at the relational database in an annotation table that includes one or more records in response to prediction of the one or more annotations, wherein each record corresponds to an annotation, and wherein each record includes the sentiment, the named entity, a primary tag indicative of a subject matter, or a secondary tag indicative of the theme.

8. A method for processing and actionizing experience data, the method comprising:

receiving, by a server, a plurality of communications, wherein each of the plurality of communications comprises voice data, wherein the voice data comprises structured or unstructured data, and wherein the voice data comprises lexical data transcribed from speech data;

parsing, by the server, the voice data from each of the plurality of communications for individual phrases to generate a plurality of phrases;

selecting, by the server, one or more phrases from the plurality of phrases based on a predetermined parameter in response to parsing the voice data;

predicting, by the server with a natural language processing (NLP) engine, one or more annotations for the one or more phrases based upon a score, wherein predicting the one or more annotations for the one or more phrases based upon the score comprises (i) predicting one or more annotations for the one or more phrases based upon a machine learning score, (ii) determining whether the machine learning score is less than a predetermined threshold score, and (iii) predicting the one or more annotations for the one or more phrases based upon a reference score in response to determining that the machine learning score is less than the predetermined threshold score; and storing, by the server, the one or more annotations at a relational database in response to predicting the one or more annotations.

9. The method of claim 8, further comprising collecting the voice data from a voice assistant, wherein receiving the plurality of communications comprises receiving the plurality of communications in response to collecting the voice data.

10. The method of claim 8, further comprising collecting the voice data from a voice-based survey, wherein receiving the plurality of communications comprises receiving the plurality of communications in response to collecting the voice data.

11. The method of claim 8, further comprising transcribing, by a transcription engine, the speech data to generate the voice data, wherein receiving the plurality of communications comprises receiving the plurality of communications in response to transcribing the speech data.

12. The method of claim 8, further comprising generating, by the server, a dashboard web page for a user that includes the one or more annotations in response to predicting the one or more annotations.

13. The method of claim 8, wherein the one or more annotations comprise a sentiment, a theme, or any named entity of the one or more phrases.

14. The method of claim 13, wherein storing the one or more annotations at the relational database comprises storing the one or more annotations in an annotation table that includes one or more records in response to predicting the one or more annotations, wherein each record corresponds to an annotation, and wherein each record includes the sentiment, the named entity, a primary tag indicative of a subject matter, or a secondary tag indicative of the theme.

15. One or more non-transitory, computer-readable storage media comprising a plurality of instructions stored thereon that, in response to being executed, cause a server to:

receive a plurality of communications, wherein each of the plurality of communications comprises voice data, wherein the voice data comprises structured or unstructured data, and wherein the voice data comprises lexical data transcribed from speech data;

parse the voice data from each of the plurality of communications for individual phrases to generate a plurality of phrases;

select or more phrases from the plurality of phrases based on a predetermined parameter in response to parsing the voice data;

predict, with a natural language processing (NLP) engine, one or more annotations for the one or more phrases based upon a score, wherein to predict the one or more annotations for the one or more phrases based upon the score comprises to (i) predict one or more annotations for the one or more phrases based upon a machine learning score, (ii) determine whether the machine learning score is less than a predetermined threshold score, and (iii) predict the one or more annotations for the one or more phrases based upon a reference score in response to a determination that the machine learning score is less than the predetermined threshold score; and store the one or more annotations at a relational database in response to predicting the one or more annotations.

16. The one or more non-transitory, computer-readable storage media of claim 15, further comprising a plurality of instructions stored thereon that, in response to being executed, cause the server to collect the voice data from a voice assistant, wherein to receive the plurality of communications comprises to receive the plurality of communications in response to collecting the voice data.

17. The one or more non-transitory, computer-readable storage media of claim 15, further comprising a plurality of instructions stored thereon that, in response to being executed, cause the server to collect the voice data from a voice-based survey, wherein to receive the plurality of communications comprises to receive the plurality of communications in response to collecting the voice data.

18. The one or more non-transitory, computer-readable storage media of claim 15, further comprising a plurality of instructions stored thereon that, in response to being executed, cause the server to transcribe, by a transcription engine, the speech data to generate the voice data, wherein to receive the plurality of communications comprises to receive the plurality of communications in response to transcribing the speech data.

\* \* \* \* \*